United States Patent [19]

Vuotto

[11] 4,020,295
[45] Apr. 26, 1977

[54] ROTARY DIAL RESTRICTION CIRCUIT

[75] Inventor: Edward Joseph Vuotto, Katonah, N.Y.

[73] Assignee: American Telephone and Telegraph Company, New York, N.Y.

[22] Filed: June 16, 1975

[21] Appl. No.: 586,894

[52] U.S. Cl. .......................... 179/90 D; 179/6.3 R; 179/189 D
[51] Int. Cl.² ......................................... H04M 1/66
[58] Field of Search ......... 179/90 D, 18 DA, 6.3 R, 179/65, 27 CB, 189 R, 189 D

[56] References Cited

UNITED STATES PATENTS

| 1,548,092 | 8/1925 | McClarence | 179/90 D |
| 3,325,599 | 6/1967 | Clark, Jr. | 179/90 D |
| 3,513,271 | 5/1970 | Stathacopoulos | 179/189 |
| 3,536,851 | 10/1970 | Burns | 179/189 R |
| 3,761,639 | 9/1973 | Uno | 179/90 D |

Primary Examiner—Kathleen H. Claffy
Assistant Examiner—Gerald L. Brigance
Attorney, Agent, or Firm—Frederick W. Padden; Paul E. Kudirka

[57] ABSTRACT

A telephone station circuit is disclosed with restriction circuitry which allows a noncoin phone to be placed in a public location by preventing the generation of dial pulses on a call from the station except when a dialed number is preceded illustratively by an initial dialed "0." The call is thereby routed to an operator for appropriate charging procedures. The disclosed circuit utilizes an ordinary noncoin rotary dial telephone with a relay which is operated to enable called number dial pulsing from the noncoin phone by a special cam arrangement. The cam arrangement in turn is actuated by the dial mechanism of the phone upon the dialing of an initial 0 digit. The restriction relay is connected in series with the station line and has a pair of normally closed contacts which shunt the dial pulse contacts to prevent normal dialing. When the station goes off-hook, the relay is prevented from operating by a separate pair of contacts, associated with the dial mechanism which contacts shunt the relay coil. The dial contacts are activated by the dial mechanism which is equipped with a pin attached to one of its gear wheels. When the dial is wound into position for dialing a 0, the pin opens the contacts thereby removing the shunt from the relay coil. The relay then operates and removes the shunt from the dial pulse contacts. The relay remains operated and dial pulses can thereafter be generated in a well-known manner.

1 Claim, 3 Drawing Figures

ROTARY DIAL RESTRICTION CIRCUIT

BACKGROUND OF THE INVENTION

This invention relates to arrangements for restricting outgoing calls from rotary dial station sets and in particular to an arrangement for using an ordinary rotary dial telehone in a public location, which arrangement allows dial pulses for a dialed number to be generated by the phone only if the number is preceded by a dialed 0.

In certain locations such as resort areas or institutions, the demand for public telephone service is high. This demand is typically handled by coin telephones and coin class central office facilities; however, the use of such facilities has presented several difficulties. First, in some areas, particularly in large schools or prisons, it is not possible to provide sufficient coin equipment to handle the demand. Secondly, in other areas, particularly resort areas, customers frequently do not have the coins which are necessary to initiate coin calls. If these customers were allowed to contact an operator without depositing coins and without using coin class central office equipment, the call could be billed through a collect, credit card, or third-party billing arrangement.

Therefore, it is desirable to permit customers to initiate public telephone service from an ordinary telephone station and associated line, thereby dispensing with the need for coin class equipment. Of course, to prevent customer misuse, a restriction arrangement must be provided. It is particularly advantageous to direct all calls to an operator position so that customers who do not have coins are able to initiate an operator-handled call.

Finally, it is desirable that the customer be allowed to dial an entire number (preceded by a 0 to route the call to an operator). With this arrangement, efficient use may be made of automated operator systems now available in many areas which systems can forward the called number to the operator. The called number provides the automatic equipment with the necessary charging and routing information so that the call may be handled rapidly after the operator is advised by the calling party how the call is to be billed.

Arrangements which allow the customer to call an operator-handled call from a public telephone without depositing coins have been utilized in the prior art. However, existing designs typically require special dial tone-first circuitry, and/or external power supply arrangements at the station set location, and special central office switching equipment. Such public telephone arrangements customarily necessitated the use of the well-known coin telephone sets and special coin classes of service to enable an operator appropriately to recognize and be informed of the charge service required on a call.

Accordingly, it is an object of the present invention to provide a noncoin rotary dial set which may be placed in a public location to allow a customer to dial an operator-handled call without depositing coins.

It is a further object of the present invention to restrict outgoing calls from a noncoin rotary dial set without requiring extensive circuitry modifications or external power supply arrangements.

SUMMARY OF THE INVENTION

The foregoing and other objects are achieved in accordance with the principles of the present invention in one illustrative embodiment thereof wherein circuitry for restricting outgoing calls from a station set to operatorhandled calls is added to a noncoin rotary dial phone. The restriction circuitry includes a relay connected across a central office line at the telephone station set. The relay has contacts which shunt the dial pulse contacts in the station set to prevent dial pulses from being generatedl until the relay operates. In accordance with the invention, the relay is prevented from operating when the station goes off-hook by a further set of contacts associated with the rotary dial mechanism which contacts shunt the relay winding. However, when the dial at the station set is wound into position for dialing a 0, a pin attached to a gear in the rotary dial mechanism opens the contacts which shunt the relay winding and allows the relay to operate. The operated relay then removes the shunt from the dial pulse contacts allowing dial pulses to be generated in the normal manner. The relay is held operated during further dialing operations by a capacitor connected across its winding by a third set of relay contacts.

When a station set is modified in accordance with the present invention, dial pulses cannot be generated from the set until after a 0 is dialed. Thus, all calls will be forwarded by the normal switching equipment located at the central office to an operator. Such calls may be switched to an operator either immediately after the dialed 0 or after all digits of the called number are dialed from the calling station. The particular call processing by an operator depends on the central office switching equipment. My illustrative station circuit is particularly useful in present day systems where call processing to an operator is on the 0+ basis in which the calling party dials 0 and all called station digits before the call is routed to an operator for service. Such a call processing system is discclosed in U.S. Pat. No. 3,484,560 issued to R. J. Jaeger, Jr., et al, on Dec. 16, 1969.

DETAILED DESCRIPTION

Figure 1:
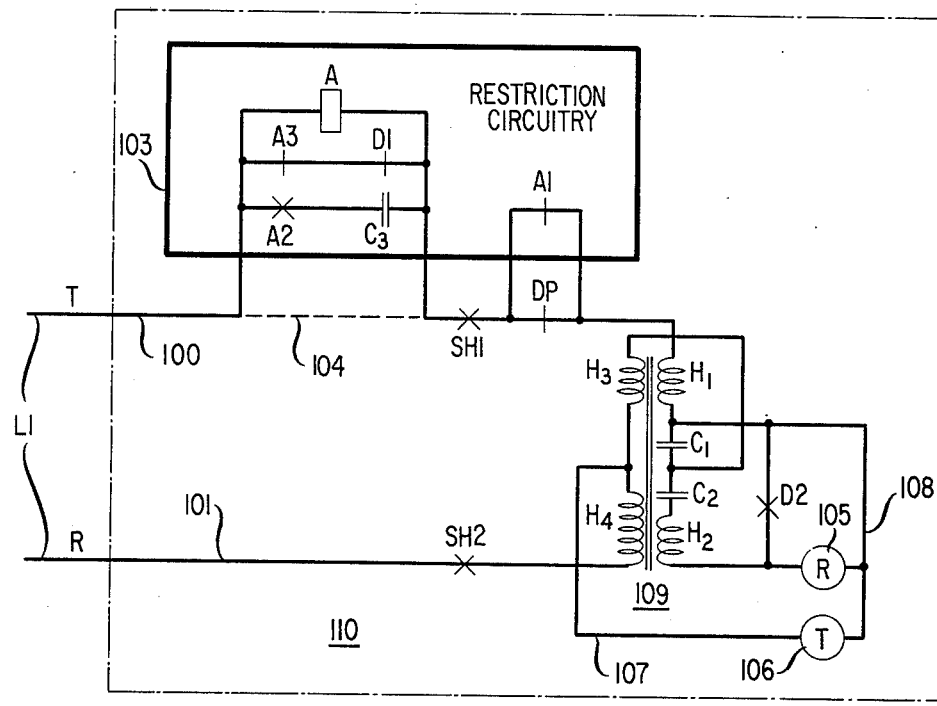
FIG. 1 is a schematic diagram of an electrical network contained in an ordinary rotary dial telephone set including the restriction circuitry modification of the present invention as shown enclosed in heavy lines.

Telephone set 110 is a noncoin telephone which is connected to the switching equipment in the central office by means of a telephone line L1 comprising two conductors such as tip conductor 100 and ring conductor 101. Assume temporarily for purposes of illustration that the restriction circuitry shown in box 103 is not attached to the telephone set 110. In such a case, tip lead 100 would be connected directly to the station set network by means of dotted lead 104. Both tip lead 100 and ring lead 101 pass through contacts SH1 and SH2 of the conventional switchhook mechanism. Contacts SH1 and SH2 are mechanically closed in a well-known manner when the handset (not shown) is lifted from its cradle. Tip lead 100 further passes through dial pulse contact DP which is used to interrupt the station loop in a controllable manner to provide called party address information to the central office switching equipment. Contact DP is mechanically operated by the motion of the rotary dial mechanism (not shown in FIG. 1). The dial mechanism is wound up by the customer pursuant to dialing a digit and contact DP is successively actuated when the dial mechanism is released and is returned to its rest position in a well-known manner. The operation of the dial mechanism and contact DP will be described in further detail hereinafter. After passing through contacts SH1, SH2 and DP, leads 100 and 101 are connected to windings $H_1$ through $H_4$ which comprise hybrid transformer 109. Windings $H_1$ through $H_4$ function in conjunction with capacitors $C_1$ and $C_2$ to provide transmission of voice frequency signals from leads 100 and 101 to receiver 105 and from transmitter 106 to leads 100 and 101. The operation of hybrid transformer 109 and associated capacitors $C_1$ and $C_2$ is well known and will not be discussed further herein. Contact D2 is an off-normal contact associated with the rotary dial mechanism which is closed during dialing operations in order to shunt receiver 105 to prevent objectionable clicks from being transmitted to the customer.

The switching equipment at the central office (not shown) normally applies negative battery to ring lead 101 and ground to tip lead 100. Assume for the purposes of explanation that the customer using telephone set 110 desires to make a call and removes the handset (not shown) from its cradle. As previously mentioned, contacts SH1 and SH2 close and a loop circuit is established through telephone set 110 to indicate to the central office a service request. The loop circuit is established as follows: negative battery on ring lead 101, contact SH2, winding $H_4$, lead 107, transmitter 106, lead 108, winding $H_1$, contact DP, contact SH1, dotted lead 104 and tip lead 100 to ground. Current flowing in this loop circuit operates a relay (not shown) at the central office which informs the switching equipment that set 110 desires service. As a result, dial tone is returned over tip ring leads 100 and 101 and is coupled through hybrid transformer 109 to receiver 105 in a well-known manner.

In order to provide address information to the central office, the customer then operates the dial mechanism which causes contact DP to open the loop circuit described above in an intermittent predetermined manner to produce dial pulses which are received by the central office and used to establish a telecommunications connection.

According to the principles of the present invention, assume now that the station set 110 is equipped with a dial restriction circuit such as circuit 103. In this case, tip lead 100 is interrupted and connected to dial restriction circuit 103 as shown in FIG. 1. (Dotted section 104 is removed.) Dial restriction circuit 103 comprises relay A and its associated contacts A1–A3. Contact A1 is bridged across contact DP as shown in FIG. 1 in order to prevent dial pulses from being generated by contact DP when relay A is not operated. Contact A2, in conjunction with capacitor C3, controls relay A after it is operated. Contacts A3 and D1 shunt the winding of relay A to control the operation of relay A. Contact D1 is associated with the rotary dial mechanism as will be hereinafter explained and functions to prevent relay A from operating unless the first digit dialed is a 0.

The function of relay A, its associated contacts and contact D1, can best be explained with reference to a telephone call which is inititated when the customer at station set 110 removes the handset (not shown) and a loop circuit is established by the following path: negative battery on ring lead 101, contact SH2, winding $H_4$, lead 107, transmitter 106, lead 108, winding $H_1$, contact DP, contact SH1, contact D1, contact A3, and tip lead 100 to ground. Thus, as before, current flowing through the loop circuit informs the central office that the customer at station set 110 desires service. Relay A, in restriction circuit 103, does not operate at this time because its winding is shunted by contacts A3 and D1. If the customer attempts to dial a digit other than 0 at this time, dial pulse contact DP will be opened and closed by the mechanical dial mechanism as in the unrestricted case. However, since dial pulse contact DP is now bridged by normally closed contact A1, no interruption of the station loop circuit will occur and no dial pulses will be forwarded to the central office.

Assume that the customer at station set 110 desires to make an operator-handled call. In this case, the customer dials a 0 as the first digit. When the rotary dial mechanism is rotated or wound into position for dialing a 0 digit, contact D1 is opened by a mechanical cam arrangement as will be hereinafter described. After contact D1 is opened, the shunt formed by contacts A3 and D1 is removed from the winding of relay A. Relay A thereupon operates over the following circuit: negative battery on ring lead 100, contact SH2, winding $H_4$, lead 107, transmitter 106, lead 108, winding $H_1$, contact DP, contact SH1, winding of relay A, and tip lead 100 to ground. Operated relay A opens contact A1 removing the bridge across dial pulse contact DP. Operated relay A further opens contact A3 preventing its coil from being shunted by contact D1 which closes when the dial mechanism is released and returns to its rest position.

When the dial mechanism is released and returns to its rest position dial pulse contact DP is operated in the normal manner. However, since bridging contact A1 is now opened by operated relay A the loop circuit through the station set is interrupted to produce dial pulses in the normal fashion. Relay A is prevented from releasing when dial pulse contact DP opens by capacitor C3 which is connected across the coil of relay A by contact A2. Contact A2 is closed, of course, when relay A operates. Thus, the customer may proceed to dial a number as he would in the unrestricted case. Since dial pulses are only forwarded to the central office when the call is preceded by a dialed 0 the central office equipment will automatically route the call to an operator position where the restricted call may be handled by the operator with or without the aid of automatic operator assistance circuitry. An incoming "restricted" call may be identified to the operator or automatic equipment at the central office by giving the restricted lines a distinctive grouping or class marking or a unique office code.

Figure 2A:
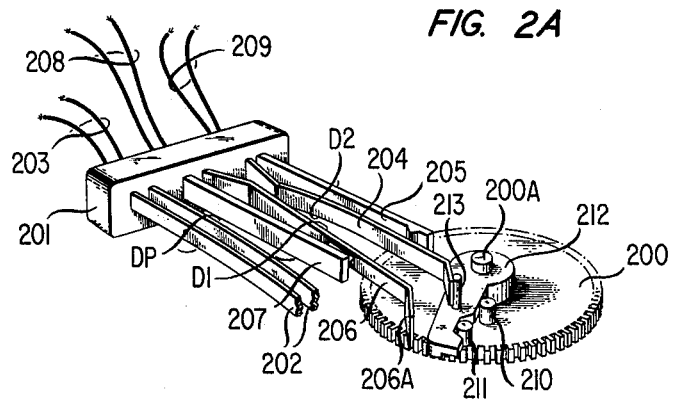
FIG. 2A of the drawing shows a gear and contact arrangement in a rotary dial set, which arrangement has been modified in accordance with the invention and, as shown, the gear arrangement is with the dial in the rest position.
Figure 2B:
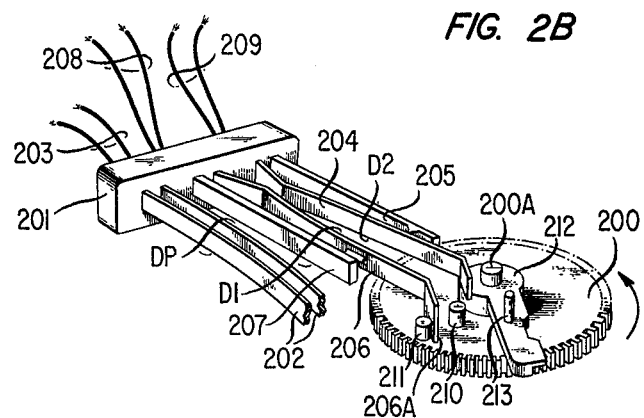
FIG. 2B of the drawing shows the same gear and contact arrangement as shown in FIG. 2A, but wound up in position for dialing a 0 digit.

FIGS. 2A and 2B depict the mechanical details of the cam arrangement which opens contact D1 when the dial mechanism is wound up in position to dial the digit 0. FIGS. 2A and 2B show a gear wheel and contact set which are found in a typical rotary dial mechanism. In particular, FIG. 2A shows the gear mechanism and contact arrangement as located when the dial is in the rest or return position. FIG. 2B shows the same gear and contact arrangement when the dial is rotated or wound up in position for dialing a 0 digit. Contact assembly 201 and gear 200, as shown in FIGS. 2A and 2B, are parts of a well-known rotary dial mechanism such as that disclosed, for example, in U.S. Pat. No. 2,963,554 issued to H. J. Hershey on Dec. 6, 1960. Contact arrangement 201 corresponds to contact arrangement 55 in FIG. 1 of the Hershey patent, and gear wheel 200 corresponds to gear wheel 41 in FIG. 1 of the above-cited patent. Gear wheel 200 is directly attached to the finger wheel of the dial mechanism via shaft 200A and rotates therewith as the dial is moved into position for dialing various digits. When the dial is in the rest position, shown in FIG. 2A, gear wheel 200 is rotated in a clockwise direction by a dial spring (not shown) causing stud 210 mounted on gear wheel 200 to press against contact operator arm 212. Contact operator arm 212 is rotatably attached to shaft 200A and thus stud 210 pushes against arm 212 causing bumper 213 mounted thereon to move contact 204 away from contact 205. Contacts 204 and 205 are connected across the telephone receiver by leads 209 and correspond to the off-normal contact D2 as shown in FIG. 1. Also, partially shown in FIG. 2A are the dial pulse contacts 202 which are connected to the telephone network by leads 203. Contacts 202 (corresponding to contact DP in FIG. 1) are operated by a gear and cam arrangement which is engaged with gear wheel 200. The operation of the dial pulse contacts is described in detail in the aforementioned Hershey patent.

In accordance with the principles of the present invention, gear wheel 200 in FIG. 2A has also advantageously been modified by the addition of pin 211 secured as shown on gear wheel 200. Pin 211 is of such a height that when gear 200 is rotated counterclockwise as the dial mechanism is moved into position for dialing a digit, pin 211 passes under contacts 204 and 205 without interfering in their operation. Pin 211 also passes under contact 206 as gear wheel 200 is rotated in the counterclockwise direction. Contact 206, however, is fitted with an extension 206A on its offset portion. Extension 206A is located close to the surface of gear wheel 200 so that pin 211 strikes extension 200A as gear wheel 200 is rotated in the counterclockwise direction preparatory to dialing a 0 digit. Contacts 207 and 206 are connected to the telephone network by means of leads 208 and correspond to contact D1 as shown in FIG. 1.

The position of gear wheel 200 when the dial mechanism is wound up preparatory to dialing the digit 0 is shown in FIG. 2B. Stud 210 has rotated with gear wheel 200, releasing contact operator arm 212 and allowing contacts 204 and 205 to close. Contacts 204 and 205 shunt the telephone receiver preventing objectionable clicks from reaching the customer during dialing. Pin 211 has contacted extension 206A on contact 206, causing contact 206 to move away from contact 207, opening the shunt across leads 208. If any digit other than 0 is dialed, gear wheel 200 will not be rotated as far as shown in FIG. 2B. Thus, pin 211 will not strike extension 206A and a shunt will be maintained by contacts 207 and 206 across leads 208. Therefore, as described previously, the dial pulse circuitry in the telephone set will be inhibited and the customer will be prevented from dialing any calls except those preceded by a 0 digit.

What is claimed is:
1. A restricted rotary dial telephone set for use on a telephone line in a telephone system having automated operator services, said set preventing generation of dial pulses corresponding to a called telephone number not prefixed with an initial 0 digit and allowing generation of dial pulses corresponding to an initial dialed 0 digit plus an entire called telephone number to allow said set to operate with said automated operator services for providing public telephone service without deposit of coins, said set comprising:
   a rotary dial mechanism having a gear wheel rotatable during dialing operations,
   dial pulse contacts connected in series with said line, said contacts being intermittently operable by said gear wheel,
   a relay having a winding, said winding having a first and a second terminal and being connected in series with said line and said dial pulse contacts, said relay further having normally-open contacts connected to said first terminal and normally-closed contacts shunting said dial pulse contacts,
   a set of normally-closed control contacts bridging said relay winding to prevent operation of said relay,
   a pin secured to said gear wheel, said pin arranged to strike and open said control contacts to enable said relay to operate when said dial mechanism is wound into position for dialing a "0" digit, and
   a capacitor connected in series with said normally-open contacts and said second terminal to hold said relay operated during dialing of subsequent digits after an initial 0 digit.

* * * * *